J. T. SMITH.
COLOR PHOTOGRAPHY.
APPLICATION FILED MAY 15, 1918.

1,390,252.

Patented Sept. 6, 1921.

INVENTOR.
JOSEPH THOMAS SMITH.
per H. C. Heide ATTORNEY.

UNITED STATES PATENT OFFICE.

JOSEPH THOMAS SMITH, OF LONDON, ENGLAND.

COLOR PHOTOGRAPHY.

1,390,252.

Specification of Letters Patent.  Patented Sept. 6, 1921.

Application filed May 15, 1918. Serial No. 234,753.

*To all whom it may concern:*

Be it known that I, JOSEPH THOMAS SMITH, a subject of His Majesty King George V, of the United Kingdom of Great Britain and Ireland and of the British Dominions beyond the Sea and Emperor of India, residing at London, England, have invented certain new and useful Improvements in or Relating to Color Photography, of which the following is a specification.

The present invention relates to that branch of photography in which a photograph in monochrome is produced on or over a color screen consisting of contiguous small areas of transparent color hereinafter called the composite color screen. The monochrome photograph so obscures or covers certain of the contiguous areas of transparent color on the composite color screen that the colors passed or transmitted by the uncovered and partly covered, otherwise partly obscured, parts so unite or commingle to the visual sense as to give the effect of a transparent picture in a certain approximation to or antichromatic with the colors of nature; and the complex or assemblage consisting of a positive photograph in monochrome with the composite color screen has an appearance as if it were a true photograph in colors. It forms, in fact, what is called a "heliochrome." Alternatively when the photograph in monochrome is a negative formed or produced in contact with the composite color screen the effect of the complex to the visual sense will be that of a negative photograph in which the colors are approximately complementary to those of the object depicted: that is to say the monochrome negative in juxtaposition with its composite color screen will appear like or simulate an antichromatic negative, or a negative showing reversed colors, as red for green, and blue for yellow, colors which are approximately complementary, but probably not strictly so.

The process of photography to which the present invention relates has hitherto been subject to certain limiting conditions, which have prevented or hindered its application to the production of finely detailed subjects, as for example such small pictures as are required on a kinematograph picture film; such pictures being ordinarily about one inch by three-quarters of an inch.

The limiting conditions which have rendered futile the realization of minutely detailed or fine textured pictures by the process of photography to which the present improvements relate are as follows.

1. Marginal or contacting defects of the color areas on the composite color screen are proportionately of greater effect in fine textures than in coarse textures, so that a limit of fineness is reached at which the subversive or encroaching effect of the marginal or contacting defects becomes predominant, so that the color effect becomes dull and weak.

2. As ruling textures especially and other textures generally, become finer; the color intensity becomes less; owing to the increasing thinness of fine lines or fine granulations, and a limit as regards fineness is reached beyond which it becomes impracticable to produce and maintain sufficient intensity of color.

3. Impurity of color or subversive staining (whether by surface coloring of a first color, when a second color is applied, or penetration and diffusion in the base) steps in notably in most methods and with increasing effect as the texture of the composite color screen is finer. When the base is gelatin, celluloid, or other substance capable of taking a stain which penetrates such base and the base is stained after having received a colored resist in granulations, particles or lines there must be a tendency for the color stain to sink in the base and diffuse under the resist-particles by lateral or oblique diffusion; thus injuring the color of the resist areas. As such injury to the color of the resist areas must of necessity commence at the edges, this injury to the color of the resist areas will be more pronounced as the resist areas are smaller.

4. When resist areas are particles of oil color applied to an absorbent surface by a method of mechanical printing as in Baumgartner's invention, described in British specification No. 22138 of the 20th day of November of the year 1895, there is not only the tendency of the staining color to penetrate the absorbent base and to diffuse laterally or obliquely under the resist particles but owing to imperfect contact and discontinuous texture of the impressed or printed color there is a high probability or perhaps a certainty of the stain running partly between the impressed or printed particles, and the base, and also engaging in the roughness or texture of the printed particles, both on the upper and lower side. Such printed particles never give that intimate contact with the base, that smooth exterior, and closely sealed edge which may be realized when the resist is a colored gelatin or gelatinoid solution delivered by a ruling pen, or as a spray dot.

The object of the present invention is to obtain a new technical effect, by certain novel or improved procedures, which are hereinafter fully described, reference being had to the accompanying drawings, in which the invention is illustrated on a much enlarged scale as applied to a two color screen, also a screen on the two color system on which is overplaced a system of supplementary color areas.

In the drawings:—

Figure 1 represents a face view of a two color screen,

Fig. 2 a transverse section thereof,

Figure 3:
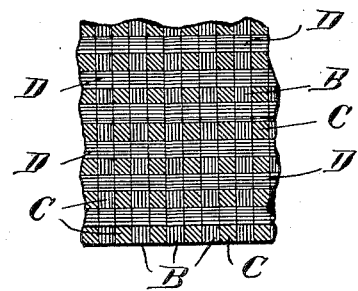
Fig. 3 represents a fragmentary face view of a screen on the two color system on which is overplaced a system of supplementary color areas, and, Fig. 4 a transverse section thereof.
Figure 5:
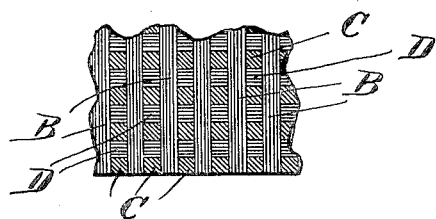
Fig. 5 represents a similar view to Fig. 3 but showing a screen in which the overplaced supplementary color only takes or bites on one of the colors previously produced.

In Figs. 3 and 5 it is to be remarked that the overplaced color areas are depicted in their own color and not in the color which over the other colors, would be given by abstraction or obstruction.

The new technical effect depends on the production of a type of composite color screen or base on which the monochrome photograph is produced, this new type of color screen or base having the following characteristics.

1. The characteristic of allowing the production of extreme fineness of the color areas together with purity and brilliancy, whereby it becomes practicable to produce pictures so fine in texture as to allow their use for such enlargement as is required in kinematograph projection.

2. Contiguity of the colors without subversive intermingling of at least two colors on the color-screen base; even when extreme fineness is realized.

3. An avoidance of or minimizing of any subversive black or dark tint between the color areas of the screen base, even when extreme fineness is realized.

4. Broadly and generally the production of a composite color screen base for the monochrome photograph, which screen base is minutely detailed and at the same time clear and pure in color of the desirable intensity. Further all parts of the screen base are of high insolubility or inertness in relation to photographic developing and fixing solutions or preparations.

In relation to fineness of texture it may be mentioned that a surface of colored grains, fortuitously disposed, may appear at first sight to be finer in texture than it really is. Thus plates prepared with color-screen base of mingle red, green and blue starch grains may show accumulations or "runs" of the three colors; these being more especially noticeable in portraiture as irregular green streaks on the face.

The means by which a color-screen base can be produced in accordance with the present invention is, in general terms as follows:

(*a*) A surface A of cellulose ester, or salt, as nitrate or acetate of cellulose is charged or coated with small distributed areas B of a water soluble colloid preparation containing a transparent color.

(*b*) The colloid areas B if not already insoluble in cold water are when necessary, or when an aqueous fluid is to be brought into contact therewith insolubilized to water and the whole is thoroughly dried.

(*c*) The surface A is treated for a short time with a solution of a color approximately complementary or antichromatic to the tint or color of the colloid preparation the solvent being one which softens the cellulose ester but not the water soluble colloid, which now forms a resist, the exposed parts C becoming colored.

(*d*) Excess color is blotted off or otherwise removed. Operations *c* and *d* may be repeated to obtain a right intensity of color.

(*e*) The surface A is treated with a fluid appropriate to remove traces of the second color which adhere mechanically to the surface of the colloid areas B; soured or acidulated water being generally appropriate when the solvent of the second color is a fluid base: as anilin for example.

(*f*) If at this stage, either color requires intensification to realize the requisite total, general, or average approximation to neutral tint, an aqueous solution of dye may be applied to further color the colloid, or alternatively a stain appropriate to affect the cellulose ester may be applied. In the latter case, operation (*e*) may require to be repeated.

(*g*) The color base, as produced at stage (*f*), will serve, when but two colors are required, the two colors being green and red or near variants. A third color, blue, may now be added by cross ruling as at D, Figs. 3 and 4, random spraying, printing or otherwise; this third color being arranged or suited to take or bite on one or both of the colors previously produced, as shown by Fig. 5.

(h) The composite color screen base may now be covered with a protective waterproof stratum E, if required, and is now ready for coating with sensitive emulsion. To more completely isolate the coloring from the emulsion the film of cellulose ester which carries the composite color screen system may be stripped from its support and cemented color-face downward on any convenient support, or a thickness of cellulose resist may be built up on the screen as hereinunder described.

As notes and amplifications on the foregoing statements in general terms the following details and particulars may be regarded as embodying characteristic features of the present invention. Paragraph headings correspond to those of the statement in general terms.

Figure 1:
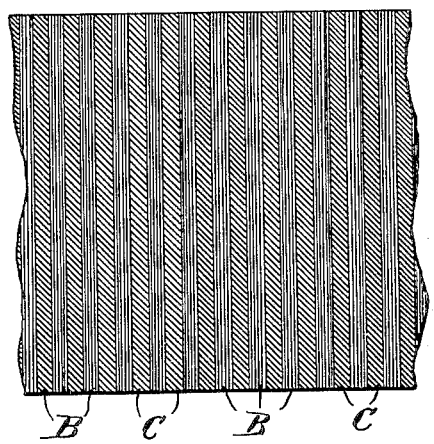
Figure 2:
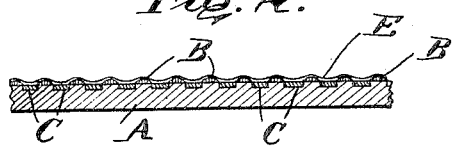

(a) *The base or surface of cellulose ester, and the colloid areas or lines.*—Although ordinary celluloid or acetate celluloid may be used, the presence of additions, as, for example, camphor in indeterminate quantity and quality (degree of purification from the accompanying oil) may disturb operations, so, when practicable the applicant prefers in the case of the finest screens to use a cellulose ester or a mixture of esters without the addition of camphor or other solid solvent. A somewhat stiff amyl-acetate collodion poured on a leveled glass slab forms a desirable base for operation, and a convenient method of retaining the film of ester on the glass is to lay an edging of india rubber on the margin of the face of the plate which is to be coated, as by painting an edging on the face of the glass with the officinal "liquor caoutchouc" or india rubber solution of the 1898 edition of *British Pharmacopœia*. Otherwise the whole surface of the glass plate may be rubbered and in this case the purest benzene without any sulfur compound may be desirable. The stratum of cellulose ester being thus obtained and conveniently supported on a level and rigid support of glass, the surface is then plotted out or partly covered as a lined or stippled system with a colloid material charged with a suitable soluble color the color being red or reddish when the second color for staining the ester is green or greenish as indicated in Figs. 1 and 2. On the other hand the color in the colloid mixture may be green or greenish, in which case the second color for staining the bare parts of the ester should be red or reddish. Other antichromatic or approximately complementary colors may be used, or any sequent colors as known in the art.

Suitable preparations for the above purposes are given by way of example.

*Solution of cellulose ester for flooding or coating the plate.*

The quality of the pyroxylin used for this purpose is a matter of some importance. The officinal "pyroxylin" prepared according to the official instructions on page 323 of the 1914 edition of the *British Pharmacopœia* is quite satisfactory but most samples of tough or "low temperature" nitro-cottons of commerce, or "surgical" pyroxylins may serve. Perfect solubility and toughness are the leading criteria.

Pyroxylin as specified 100 grains. Amyl acetate 4 fluid ounces.

About 100 grains of this collodion or solution may be used as the dose for coating a quarter-plate—($3\frac{1}{4} \times 4\frac{1}{4}$ inches); this giving a desirable thinness of film when the finest lines or grains are to be formed.

*Colloid mixture or ink for lines or granulation.*

*Red.* Para-rosanilin color-base 12 weight units or grains; water 240 weight units or grains; glacial acetic acid 10 weight units or grains. When all is dissolved add fish glue 140 weight units or grains.

Excess of acetic acid should be avoided, as also the use of fish glue which is acid, as acidity of the mixture may cause the anilin solution (or like solution) of green dye to adhere to the lines.

Para-rosanilin color-base (as distinguished from para-rosanilin leuco-base) is regarded by chemists as triamino-phenyl-carbinol, and applicant believes that this is the color base of the dye known in commerce as "diamond magenta." To be specially appropriate for use in relation to the present invention the para-rosanilin color base should be free from phenyl or alkyl substitution products which give a bluish cast to the color. An ordinary rosanilin base or similar base may be used but in preparing the color the crimson cast should be preferred. Crimson colors of the nature of magenta are well known to experts in anilin colors.

The fish-glue used is the semi-fluid kind sold commercially as "Le Page's Special Photo-engraving glue for process work," this is understood to be guaranteed as free from acid.

*Green colloid solution.*

Acid green color of commerce 10 weight units or grains, water 55 weight units or grains. Add the following mixture: Fish glue (as noted above) 40 weight units or grains; water 50 weight units or grains.

Any undue acidity should be avoided as in the case of the red colloid mixture, and all such mixtures. The colloid inks for the purpose of the present invention may be colored to suit whatever color combination is selected for the composite color screen, the selection being according to well known principles. The color must however be soluble in water.

Alternatively the colloid mixture may be uncolored and after the lines or areas are insolubilized; they may be colored by the use of an aqueous solution of dye as explained under heading (f).

The perfect adhesion of the colloid resist to the surface of cellulose ester is a matter of prime importance as if adhesion is imperfect the stain applied to the ester surface may diffuse between the lines or areas of colored colloid and the cellulose ester.

To secure proper adhesion and easy flow (conditions closely interrelated) an appropriate colloid is a first necessity. If the colloid layer is to be applied to the cellulose ester by ruling or the like the above-mentioned preparations of fish glue or a near technical equivalent as gum arabic are especially suitable as the fish glue preparations remain conveniently soluble during the operation of ruling, but in this case insolubilization of the fish glue becomes desirable in all cases and essential when an after process of recharging with color or intensification, as described below is to be practised.

(b) *Insolubilization of the colloid areas or lines and complete drying.*—To insolubilize the fish glue ruling, the ruled plate is by preference exposed to the vapor of formaldehyde, conveniently from an aqueous solution of formaldehyde; another method being to add a soluble chromate to the ruling ink or mixture, and to allow time or light, or both to bring about insolubility of the dry lines.

Insolubilization of fish glue areas in a vapor bath of formaldehyde has been touched upon, but if desired the formaldehyde vapor bath may be used for a supplementary hardening, alternatively a formaldehyde liquid bath may be used for any colloid areas or lines which are not immediately soluble in cold water. For the first stage in insolubilizing the areas of unchromated fish glue, the formaldehyde vapor is of great value, as it in no sense or degree impairs the sharpness or perfection of the marginal parts of the areas.

After insolubilization, and before the next stage, (c), the gelatinous or gelatinoid areas or lines should be thoroughly desiccated: this being conveniently done by slight warmth, or by leaving the surface for a time in a cold drying box containing for example calcium chlorid.

(c) *Staining the cellulose ester between the gelatinous or gelatinoid areas.*—The solvent of the staining fluid should be of such a nature as to penetrate, soften, or incipiently dissolve the bare surface of the cellulose ester, but not so active as to in any way affect, attack or soften the colloid areas, in the sense of making the base so pasty or soft as to bring about removal of the lines or areas of resist material, videlicit colloid.

Ordinary alcohol, methyl alcohol, and acetone as such, and while anhydrous fulfill the above conditions but as in drying or evaporating these solvents adsorb moisture, their use often or generally involves a slight subversive staining of the colloid areas, the aqueous residue drifting over to the colloid resist and staining it.

A solution of anilin color in anilin itself is well known as an ink for writing on celluloid and is especially suitable, as the surface of the colloid areas is not stained or attacked, provided that the herein stated precautions are observed.

Solutions suitable for the purpose of the present invention are as follows:—

1. Anilin of the grade sold commercially as "analytical reagent" or A. R. 100 weight units or grains. "Acid green" anilin color, 12 weight units or grains.

2. Anilin, as above 100 weight units or grains. "Methyl red" anilin color 4 weight units or grains.

The plate bearing the stratum of cellulose ester on which are greenish or reddish lines of colloid, as described, having been well desiccated is quickly and uniformly brushed or mopped or soft rollered over with the green or the red dye dissolved in anilin, the green solution being used if the colloid lines are red, and the red solution being used if the colloid lines are green.

(d) *Blotting off.*—After a short interval, 3 to 30 seconds for example, the excess is blotted off with a soft pad, and if necessary other similar applications and blottings off follow. By several short treatments, as contrasted with one prolonged action the tendency of the dye to penetrate laterally or obliquely under the colloid lines is diminished or minimized. The adjustment of the activeness of the solvent in relation to the quality of the base of ester, celluloid or the like, is an important aspect of the present invention. As above stated the purer anilin sold as "analytical reagent" is the preferred solvent and it is believed that this will generally and perhaps invariably suit a surface of film consisting of the pure cellulose ester (cellulose nitrate) as deposited from the solution in amyl acetate. This purer anilin is also suitable for many or perhaps most qualities of commercial celluloid films, but the applicant has met with qualities so resistant to the action of pure anilin as a solvent, that endeavors to stain the material with the anilin solutions given above were futile. In such a case one procedure is to first slightly soften the surface of the celluloid with methyl alcohol, amyl acetate, acetone or like and then to apply the solution of dye in anilin. Alternatively the above mentioned solvents may be mixed with the anilin solution of the dye.

In the case of a quality of celluloid which is extremely resistant to solvents, nitrobenzene may be used in a similar way to increase the solvency of the anilin or like. In an extreme case the staining dye may be dissolved in the pure nitrobenzene, but in all ordinary cases the solvent or softening powers of such a solution would be excessive.

In the use of nitrobenzene especially by itself there may be some care required in selecting a suitable color, but the inventor found malachite green to readily dissolve in a sample of nitrobenzene which he had purified to the utmost. This solution kept well for a few weeks and instantly stained the hardest celluloid of the applicant's selection.

(e) *Acid bath or souring bath.*—It is now generally expedient to remove the excess of anilin by soaking the plate in weak sulfuric acid for about 4 minutes: one weight unit of sulfuric acid to from 20 to 100 weight units of water being convenient. The plate is now washed and dried. This treatment in the acid bath also tends to remove any trace of the anilin mixture which may adhere to the surface of the colloid resist. Other rinsings appropriate to the stain and its menstruum may be used.

(f) *Intensification of color on colloid areas or that on the cellulose ester.*—To intensify the colloid areas an aqueous solution of an anilin dye should be used and the plate should be thoroughly dry in order that the film of ester may become hard and compact so as not to readily take color from an aqueous solution. That the pyroxylin or ester should be of the tough kind rather than pulverent or soft kind is sufficiently indicated above. In intensifying the stain on the cellulose ester surface, care should also be taken that the plate is completely dry. The process of intensification is merely another operation as detailed under the heading c. By using a suitable dye, tint (as also intensity) may be modified by the intensification.

Figure 4:

(g) The instructions so far serve to produce a composite color screen in two colors such as that shown by Figs. 1 and 2, the third color D if required being added afterward, either as an independent blue ruling, lining or spraying which impartially takes upon both elements of the two color screen Figs. 3 and 4, or alternatively the blue color may be made discriminative in the following manner.

Let it be supposed that the green areas are produced in the film of cellulose ester and that the red color is embodied in the colloid areas. If now a solution of anilin blue in anilin or its technical equivalent as herein indicated is ruled or sprayed or otherwise applied, and after blotting off the plate is treated in the above mentioned souring bath the blue color D will take only on the green areas C where it will be especially required and will not take on the colloid surface B charged with red. Alternatively if the colloid lines are green, an aqueous solution of blue dye with or without the addition of a water soluble colloid may be sprayed or ruled or otherwise applied as a scattering over the whole surface, and on rinsing off with water, the blue will leave its impress most notably or entirely on the green colloid lines. The tints or colors involved in this kind of discriminative treatment may be varied according to the requirements of the color scheme.

When the blue is to cross the green or partly cover the green an original green of a yellower tint is indicated than when the green is to form part of a two color system, on the other hand when the greenish color of the two color system is a greenish blue (alternatively a bluish green), the third color applied in any of the above modes (discriminative or general) may be yellow instead of blue as specified. In this case the yellow over the greenish-blue gives green by abstraction or obstruction, leaving the uncovered portions of the greenish blue to form another element of the combination.

(h) *Insulation between the composite color screen and the sensitive stratum.*—An especially expedient course when flexible surfaces or "films" are required for exposure in the camera is to strip the composite color screen as prepared on a glass support and to mount the stripped composite color screen ester side upward, on ordinary celluloid, this giving an inert or nonactive side for coating with the sensitive emulsion. For this purpose the receiving surface of celluloid should be made slightly adhesive as by a thin coating of amyl acetate collodion and the stripped composite color screen is pressed, color side downward, into close contact and adhesion. In this operation the least practicable quantity of adhesive should be used, so as to minimize any interdiffusion or overlap of color. Heat may be employed with the pressure, or alternatively heat and pressure may be employed without any adhesive. Instead of applying adhesive as such the celluloid or ester surface may be moistened or fumed with a solvent, as for example, amyl acetate.

Successive thin coatings of celluloid varnish or cellulose ester varnish prepared, for example, with amyl acetate as a solvent as hereinbefore specified, may now be applied: thorough drying being effected between the applications. Thus is built up any required thickness of inert protective material between the composite color screen and the emulsion, or the composite color screen and any chemical used in after-treatment. The reason for using successive thin coatings is to prevent such softening of the whole mass as may lead to subversive interdiffusion of the colors, and if desirable a thin stratum of india rubber or resinous material may be used between any two coatings. The operation of transfer makes it practicable to thicken the back or front of the original film of cellulose ester or like, but where no transfer is made the india rubber substratum may conveniently cover the whole surface of the glass plate instead of being confined to the edges.

Although anilin is mentioned as a desirable solvent for such colors as is used to stain the cellulose ester, other solvents may be used, the whole range of what may be vaguely termed alcoholic etherial or aromatic solvents being more or less available, and the solvent must be selected in reference to the coloring body used. Preference is however given to basic solvents which are physically and chemically comparable to anilin: removal in an acid bath being easy, and in this connection may be mentioned the liquid toluidins (ortho-toluidin and meta-toluidin), whether alone or with anilin.

It should be understood that the composite color-screen produced as herein described by interdependent coloring and staining in stages may be formed on ordinary thin celluloid or on similar sheets of cellulose ester without camphor either after manufacture or while the celluloid is with or on the molding plate or molding wheel, and emulsion may be laid on either side of the stripped sheet as may be expedient.

It should be understood that in its essence, the new technical effect realized by the present invention, namely a clear and definite distinction between the colors of the composite color screen by the herein described improvements as to interdependent coloring on a base of cellulose ester or like, allows extremely fine composite color screens to be made without subversive overlap of the coloring; but the present invention also allows of usual or even specially coarse screens for large subjects to be made of a higher quality and luminosity than has hitherto been possible. The present invention therefore is inherently applicable to the production of unusually large subjects of improved character.

Fluid bases having a more decided alkalinity than anilin (or the above mentioned homologous bodies) or a greater miscibility with water, appear to be generally undesirable as solvents, or at any rate less desirable than anilin or like. As regards the matter of miscibility with water the reason is explained above, and as regards a higher degree of alkalinity the disadvantage may affect certain colors, more notably the methyl red which is mentioned above. The applicant found that pyridin, whether in the form sold as "pure" or that sold as "commercial," very instantaneously destroys the red color of methyl red dissolved in anilin, and similarly a crude "chinolin" obtained by distilling cinchonin with potash destroys the red color of methyl red which has already been dissolved in anilin. As a comment it may be remarked that methyl red in a solution which is mainly aqueous, is known to be highly sensitive to alkalis and alkaloids, hence its use as an indicator; anilin in its purer form as specified, however, was found not to dim the red color of the methyl red.

The applicant suggests as desirable the avoidance of fluid bases like pyridin or chinolin (including lepidin and homologous bases) which tend to unite with water and which are notably more alkalin than anilin.

In ruling lines of two or more colors in sequence on a surface, so that the lines fit together an essential condition is an exact outline of the lines without irregularity; otherwise the fit of line to line will be defective. In relation to the mode of interdependent staining herein described there is no necessity to rule the lines with straight or regular edges and indeed a little irregularity may be an advantage as breaking down or minimizing the regular lined effect. Therefore the applicant finds it occasionally desirable to so vibrate or irregularly move the ruling pen or device as to give a rough or dotted aspect to the individual lines. There are well known mechanical means for doing this.

In all heliochromic processes it may be expedient to introduce a neutral key element to conduce to critical sharpness and also intensity. One way in which a neutral key can be associated with results by the present process is to superimpose a weak monochrome taken actually from the same standpoint: any suitable or known optical device being used for this purpose. Another mode suited for kinematograph projection is to alternatively produce heliochromes, by the herein described process, and monochromes on the same film a lens of higher or deeper defining power being preferably used for the monochrome alternations. In the final or exhibition film the heliochromes and weak monochromes would be cast on the screen in alternation.

A preliminary ruling or scattering in stain may be produced on the ester or celluloid base by the following method this preliminary staining corresponding in function with a third scattering or ruling on the two color system, so this preliminary ruling or scattering in stain will ordinarily be blue, bluish, or in special cases yellow green.

In colloid ink or resist of the kind herein described, but of any convenient color or uncolored, a ruled or scattered resist is laid. This being dried but not insolubilized, the interspaces are stained with a solution of a dye in a solvent which softens the celluloid, the conditions for selecting this being as hereinabove defined. The colloid ink (or dummy ink) is now washed off with water and the surface of celluloid or similar material is treated for two color effect as already described.

What I claim is:

1. Process of forming a discriminative composite, color-screen suited to control a photographic monochrome, which process comprises laying colloid lines or areas with a fluid aqueous colored colloid on a base which is non-absorbent for aqueous preparations but is generally adsorbent and absorbent for alcoholic and aromatic preparations, then after drying staining the base by a solution of a dye in a fluid which the base adsorbs; the color of the stain being broadly or generally antichromatic to the color in the aqueous colloid.

2. Process for the manufacture of polychrome screens for color photography which process comprises the following operations:— to wit, laying colloid areas with a fluid aqueous colored colloid on a base of the nature described, and then after drying staining the uncovered parts of the base with a solution of a color broadly antichromatic to the color in the aqueous colloid and dissolved in a fluid of the nature described which the base can adsorb, but with the said base so thin that the second color cannot penetrate or diffuse laterally under the colloid lines to such degrees as to injure the color combination by overlap of color.

3. Process for the manufacture of polychrome screens for color photography which process comprises the following operations:— to wit, laying colloid areas with a fluid aqueous colored colloid on a base of the nature described, and then after drying staining the uncovered parts of the base with a solution of a color broadly antichromatic to the color in the aqueous colloid and dissolved in a fluid of the nature described which the base can adsorb, but with the application of the second color in short stages alternated with clearings off, so as to keep the stain well to the surface and minimize any lateral diffusion under the colloid lines.

4. Process for the manufacture of polychrome screens for color photography which process comprises the following operations:— to wit, laying colloid areas with a fluid aqueous colored colloid on a base of the nature described and then after drying staining the uncovered parts of the base with a solution of a color broadly antichromatic to the color in the aqueous colloid and dissolved in a fluid of the nature described which the base can adsorb, but with immersion of the doubly colored base in a fluid of the nature described calculated to clear or remove traces of the second color from the colloid lines.

5. Process for the manufacture of polychrome screens for color photography which process comprises the following operations:—to wit, laying colloid areas with a fluid aqueous colored colloid on a base of the nature described, and then after drying staining the uncovered parts of the base with a solution of a color broadly antichromatic to the color in the aqueous colloid and dissolved in a fluid of the nature described which the base can adsorb, but with a special or high degree of desiccation of the colloid lines or areas, in order to render such lines or areas inactive to the second application of color.

6. Process for the manufacture of polychrome screens for color photography which process comprises the following operations:—to wit, laying colloid areas with a fluid aqueous colored colloid on a base of the nature described, and then after drying staining the uncovered parts of the base with a solution of a color broadly antichromatic to the color in the aqueous colloid and dissolved in a fluid of the nature described which the base can adsorb, but with the water soluble colloid preparation suited for insolubilization by the vapor of formaldehyde; the water soluble lines being made insoluble by the vapor of formaldehyde.

7. Process for the manufacture of polychrome screens for color photography which process comprises the following operations:—to wit, laying colloid areas with a fluid aqueous colored colloid on a base of celluloid ester, and then after drying staining the uncovered parts of the base with a solution of a color broadly antichromatic to the color in the aqueous colloid and dissolved in a fluid of the nature described which the base can adsorb, but with the after mounting of the film of ester bearing the composite color-screen on a firmer support.

8. Process for the manufacture of polychrome screens for color photography which process comprises the following operations:—to wit, laying colloid areas with a fluid aqueous colored colloid on a base of the nature described, and then after drying staining the uncovered parts of the base with a solution of a color broadly antichromatic to the color in the aqueous colloid and dissolved in a fluid of the nature described which the base can adsorb, but with an after-intensification of the color in the colloid areas by immersion in an aqueous solution of dye.

9. Process for the manufacture of polychrome screens for color photography which process comprises the following operations:—to wit, laying colloid areas with a fluid aqueous colored colloid on a base of the nature described and then after drying staining the uncovered parts of the base with a solution of a color broadly antichromatic to the color in the aqueous colloid and dissolved in a fluid of the nature described which the base can adsorb, but with an after intensification of the color on the base by the application of a dye dissolved in a fluid of the nature described.

10. Process for the manufacture of polychrome screens for color photography which process comprises the operations set forth in claim 1, and, on a two-color system of color areas thus produced, overplacing a system of supplementary color-areas.

11. Color screen on a base of the nature described which carries colored areas in colloid, and antichromatic areas in stain on the base, said colloid areas having intimate contact with the base, smooth exterior, and closely sealed edge.

12. Process for the manufacture of polychrome screens for color photography, which process comprises a preliminary partial staining of a base of the nature described under the control of colloid areas of resist, washing off such areas of resist, then on said base laying colloid areas with a fluid aqueous colored colloid, and then after drying staining the base by a solution of a dye in a fluid which the base adsorbs; the color of the stain being broadly or generally antichromatic to the color in the aqueous colloid.

In testimony whereof I affix my signature.

JOSEPH THOMAS SMITH.